US009819046B2

(12) United States Patent
Choi et al.

(10) Patent No.: US 9,819,046 B2
(45) Date of Patent: Nov. 14, 2017

(54) RECHARGEABLE BATTERY

(71) Applicant: Samsung SDI Co., Ltd., Yongin-si, Gyeonggi-do (KR)

(72) Inventors: Hyun-Jin Choi, Yongin-si (KR); Jun-Sung Ahn, Yongin-si (KR); Na-Ri Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 174 days.

(21) Appl. No.: 14/884,682

(22) Filed: Oct. 15, 2015

(65) Prior Publication Data
US 2016/0126585 A1 May 5, 2016

(30) Foreign Application Priority Data

Oct. 31, 2014 (KR) .................. 10-2014-0150589

(51) Int. Cl.
| H01M 4/00 | (2006.01) |
| H01M 10/04 | (2006.01) |
| H01M 2/02 | (2006.01) |
| H01M 2/06 | (2006.01) |
| H01M 10/0587 | (2010.01) |

(52) U.S. Cl.
CPC ....... *H01M 10/0431* (2013.01); *H01M 2/024* (2013.01); *H01M 2/0212* (2013.01); *H01M 2/06* (2013.01); *H01M 10/0587* (2013.01)

(58) Field of Classification Search
CPC ......... H01M 10/0431; H01M 10/0587; H01M 2/0212; H01M 2/024; H01M 2/06
See application file for complete search history.

(56) References Cited

U.S. PATENT DOCUMENTS

2003/0099880 A1* 5/2003 Park .................. H01M 2/26
429/211
2010/0285342 A1* 11/2010 Lee .................. H01M 2/34
429/94
2014/0248528 A1* 9/2014 Takahata ............... H01M 4/133
429/156

FOREIGN PATENT DOCUMENTS

| JP | 2001-266946 | 9/2001 |
| KR | 10-2011-0007785 A | 1/2011 |
| KR | 10-1009517 B1 | 1/2011 |

* cited by examiner

Primary Examiner — Raymond Alejandro
(74) Attorney, Agent, or Firm — Knobbe Martens Olson & Bear LLP

(57) ABSTRACT

A rechargeable battery that includes: an electrode assembly with a first electrode and a second electrode that include uncoated regions and coated regions; a case; a first electrode tab and a second electrode tab coupled to the first and second electrodes; and a laminating tape attached to opposite surfaces of a front end portion disposed at a center of the electrode assembly and opposite surfaces of a terminal end portion disposed at an outermost side of the electrode assembly. The second electrode tab is coupled to the uncoated region of the second electrode toward the uncoated region of the first electrode in the terminal end portion that is disposed at the outermost side of the electrode assembly, the first electrode tab is coupled to the uncoated region of the first electrode while being disposed closer to the coated region than the second electrode tab in the terminal end portion that is disposed at the outermost side of the electrode assembly, and an insulating laminating tape for preventing the second electrode tab and the uncoated region of the first electrode from electrically contacting each other is further included.

14 Claims, 6 Drawing Sheets

RECHARGEABLE BATTERY

RELATED APPLICATIONS

This application claims priority to and the benefit of Korean Patent Application No. 10-2014-0150589 filed in the Korean Intellectual Property Office on Oct. 31, 2014, the entire contents of which are incorporated herein by reference.

BACKGROUND

Field

The present invention relates to a rechargeable battery with a laminating tape attached to an end of a coated region of each of electrodes.

Description of the Related Technology

With advancement of technology for mobile devices, demand for rechargeable batteries as energy sources has been increasing.

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be used as a power source for driving motors of a hybrid vehicle, an electric vehicle, and the like.

For example, a rechargeable battery includes an electrode assembly for performing charging and discharging operations, a case (or pouch) for accommodating the electrode assembly, and electrode tabs through which the electrode assembly is drawn out of the cap plate.

As a high-capacity trend of the rechargeable battery continues, energy density increases and safety deteriorates as well.

In order to improve this, at an outermost side of the electrode assembly disposed in a terminal end of a positive electrode, an uncoated region is provided to be longer such that when a conductive member penetrates, a positive electrode member and a negative electrode member may cause an initial short-circuit.

That is, by forming an uncoated region of the positive electrode to be longer, penetration characteristics of the conductive member can be improved.

However, since an uncoated region of the positive electrode may contact the negative electrode tab, it is not easy to apply a structure in which the uncoated region of the positive electrode is formed longer to face the negative electrode member.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One aspect of the present invention provides a rechargeable battery that is capable of enhancing safety as well as improving penetration characteristics of a conductive member.

A rechargeable battery according to an exemplary embodiment of the present invention includes: an electrode assembly spirally wound by interposing a separator between a first electrode and a second electrode that include uncoated regions and coated regions; a case for accommodating the electrode assembly; a first electrode tab and a second electrode tab coupled to the first and second electrodes to be drawn out of the case; and a laminating tape attached to opposite surfaces of a front end portion disposed at a center of the electrode assembly and opposite surfaces of a terminal end portion disposed at an outermost side of the electrode assembly. The second electrode tab is coupled to the uncoated region of the second electrode toward the uncoated region of the first electrode in the terminal end portion that is disposed at the outermost side of the electrode assembly, the first electrode tab is coupled to the uncoated region of the first electrode while being disposed closer to the coated region than the second electrode tab in the terminal end portion that is disposed at the outermost side of the electrode assembly, and an insulating laminating tape for preventing the second electrode tab and the uncoated region of the first electrode from electrically contacting each other is further included.

The coated regions may be formed on opposite surfaces of the first electrode and on opposite surfaces of the second electrode, and the laminating tape may include a first front end tape that is attached to opposite ends of the coated region of the first electrode in the front end portion, and a first terminal end tape that is attached to opposite ends of the coated region of the first electrode in the terminal end portion.

The laminating tape may include a second front end tape that is attached to opposite ends of the coated region of the second electrode in the front end portion, and a second terminal end tape that is attached to opposite ends of the coated region of the second electrode in the terminal end portion.

The insulating laminating tape may be attached to the uncoated region of the first electrode that faces the second electrode tab.

The insulating laminating tape may be attached to the second electrode tab that faces the uncoated region of the first electrode.

The insulating laminating tape may be formed of polyethylene terephthalate.

The first electrode may be a positive electrode, and the second electrode may be a negative electrode.

As described above, according to the exemplary embodiment of the present invention, the insulating laminating tape is provided between the second electrode tab and the uncoated region of the extended first electrode at the outermost side of the spirally wound electrode assembly such that the second electrode tab and the first electrode uncoated region are prevented from electrically contacting each other, thereby enhancing the safety as well as improving the penetration characteristics of the conductive member.

DETAILED DESCRIPTION OF CERTAIN INVENTIVE EMBODIMENTS

Figure 1:
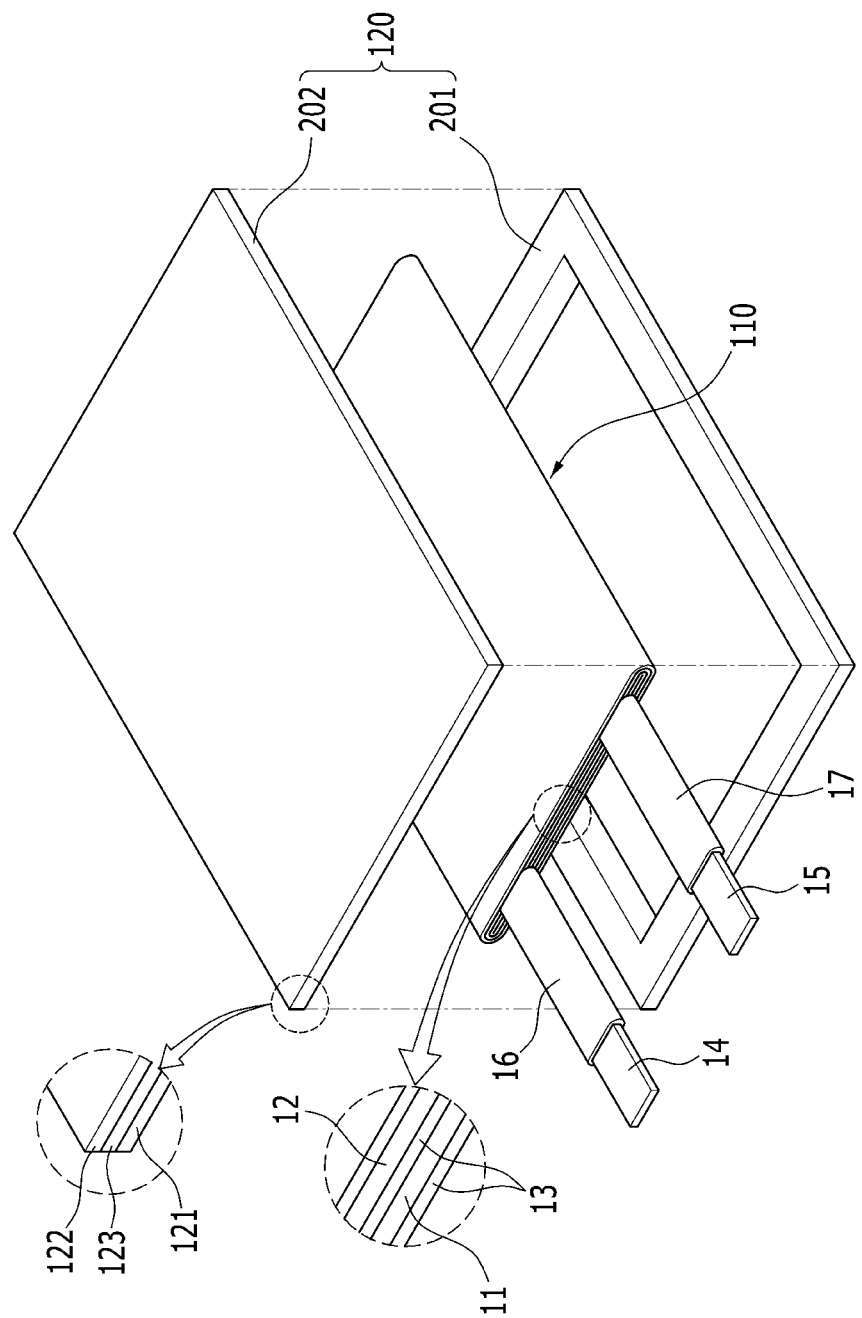
FIG. 1 is an exploded perspective view of a rechargeable battery according to a first exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 2:
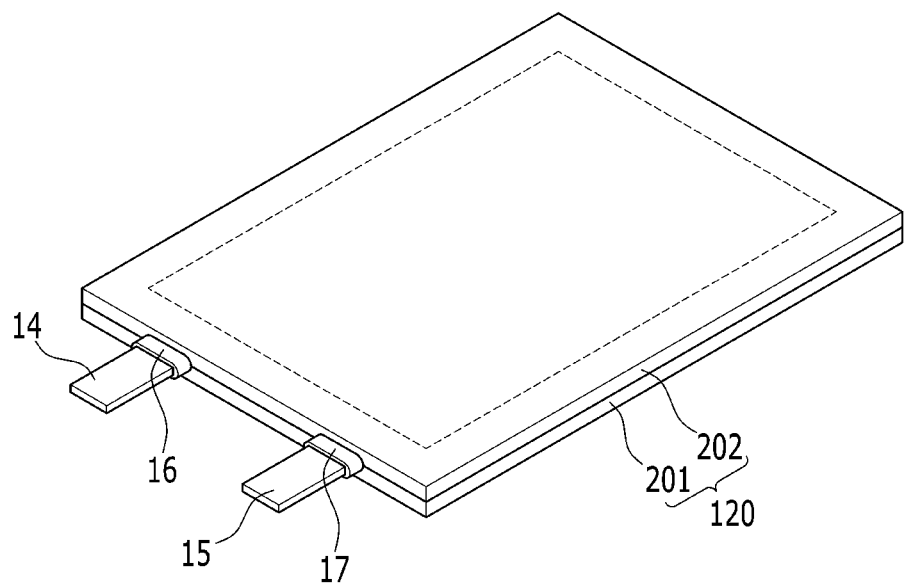
FIG. 2 is an assembled perspective view of a rechargeable battery of FIG. 1.

FIG. 1 is an exploded perspective view of a rechargeable battery according to a first exemplary embodiment of the present invention, and FIG. 2 is an assembled perspective view of a rechargeable battery of FIG. 1.

Referring to FIGS. 1 and 2, the rechargeable battery of the first exemplary embodiment includes an electrode assembly 110, and a case for accommodating the electrode assembly 110 (e.g., hereinafter referred to as "pouch 120").

The electrode assembly 110 is formed in a jelly-roll form by disposing a first electrode 11 (for convenience, referred to as a "positive electrode") and a second electrode 12 (for convenience, referred to as a "negative electrode") while interposing a separator 13 therebetween.

The separator 13 may be formed of a polymer film through which lithium ions can pass.

The electrode assembly 110 further includes a first electrode tab 14 (for convenience, referred to as a "positive electrode tab") and a second electrode tab 15 (for convenience, referred to as a "negative electrode tab") that are respectively coupled to the positive and negative electrodes 11 and 12.

Figure 3:
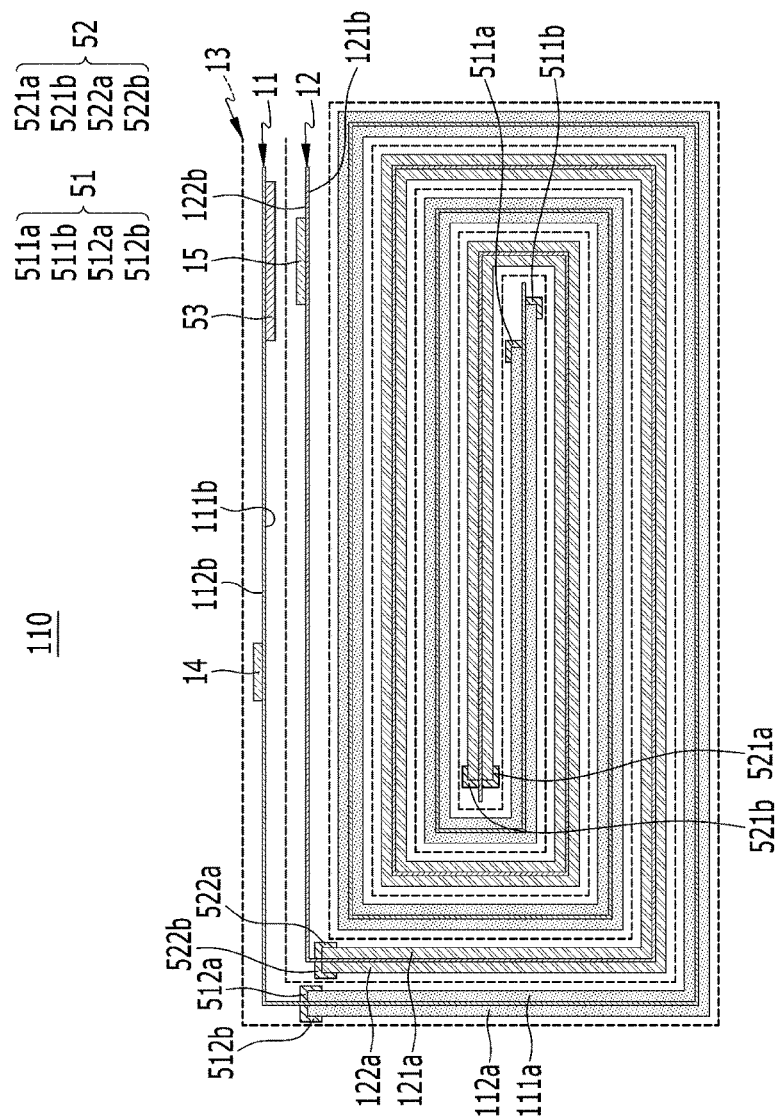
FIG. 3 is an enlarged cross-sectional view of an electrode assembly applicable to FIG. 1.
Figure 4:
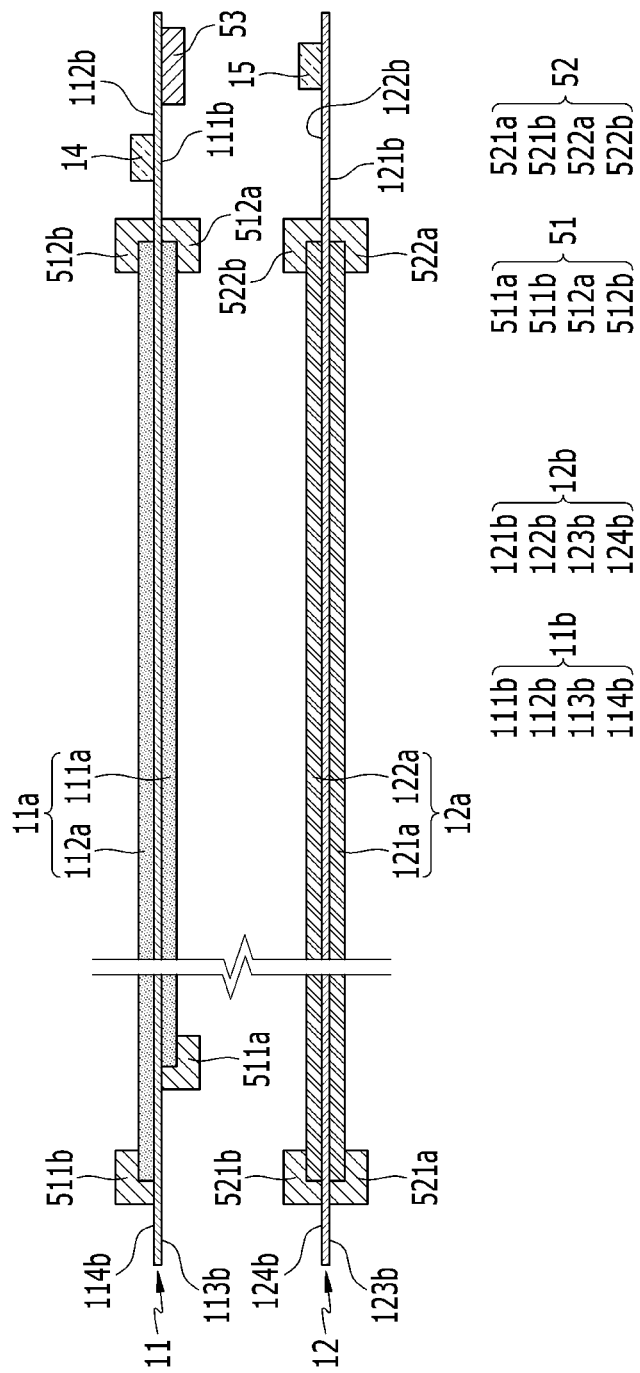
FIG. 4 is a cross-sectional view illustrating a state of a positive electrode and a negative electrode applicable to the electrode assembly of FIG. 3 being unfolded.

FIG. 3 is an enlarged cross-sectional view of an electrode assembly applicable to FIG. 1, and FIG. 4 is a cross-sectional view illustrating a state of a positive electrode and a negative electrode applicable to the electrode assembly of FIG. 3 being unfolded.

For convenience, the separator 13 is omitted in FIG. 4

The positive electrode 11 includes a coated region 11a where an active material is coated on a current collector made of a thin metal plate (an inner coated region 111a and an outer coated region 112a), and an uncoated region 11b that is formed as an exposed current collector because an active material is not coated thereon.

For example, the current collector of the positive electrode 11 and the positive electrode tab 14 may be formed of aluminum (Al).

The negative electrode 12 includes a coated region 12a where an active material different from the active material of the positive electrode 11 is coated on a current collector made of a thin metal plate (an inner coated region 121a and an outer coated region 122a), and an uncoated region 12b that is formed as an exposed current collector because an active material is not coated thereon.

For example, the current collector of the negative electrode 12 and the negative electrode lead 15 may be formed of copper (Cu).

The positive electrode tab 14 is coupled to the uncoated region 11b of the positive electrode 11, and the negative electrode tab 15 is coupled to the uncoated region 12b of the negative electrode 12 while being spaced apart from the positive electrode tab 14.

The positive and negative electrode tabs 14 and 15 are drawn out of the same lateral side of the electrode assembly 10 (to the left of FIGS. 1 and 2) and are separately disposed thereat.

Though not illustrated, the positive and negative electrode tabs may be respectively disposed at opposite lateral sides of the electrode assembly (to the left and right of FIGS. 1 and 2).

Referring back to FIGS. 1 and 2, the electrode assembly 110 is accommodated into the pouch 120 and an outer portion of the electrode assembly 110 is then thermo-bonded, thereby forming the rechargeable battery.

In this case, the positive and negative electrode tabs 14 and 15 are coated with insulating members 16 and 17 to be drawn out of the pouch 120 through the thermo-bonded portion.

That is, the insulating members 16 and 17 electrically insulate the positive electrode tab 14 from the negative electrode tab 15, and electrically insulate the positive and negative electrode tabs 14 and 15 from the pouch 120.

The pouch 120 may be formed to have a multi-layered sheet structure that encloses an exterior of the electrode assembly 110.

For example, the pouch 120 includes a polymer sheet 121 that forms an inner side and performs insulating and thermo-bonding functions, a PET (polyethylene terephthalate) sheet that forms an outer side and performs a protecting function, a nylon sheet or a PET-nylon composite sheet 122 (for convenience, a "nylon sheet" will be exemplarily described), and a metal sheet 123 provided for mechanical strength.

The metal sheet 123 is interposed between the polymer sheet 121 and the nylon sheet 122, and may be formed of, for example, an aluminum sheet.

The pouch 120 includes a first exterior member 201 that accommodates the electrode assembly 110, and a second exterior member 202 that covers the electrode assembly 110 and is thermo-bonded to the first exterior member 201 outside of the electrode assembly 110.

The first and second exterior members 201 and 202 may be formed to have the same layered structure consisting of the polymer sheet 121, the nylon sheet 122, and the metal sheet 123.

For example, the first exterior member 201 is concavely formed to accommodate the electrode assembly 110, and the second exterior member 202 is flatly formed to cover the electrode assembly 110 that is accommodated in the first exterior member 201.

Though not illustrated, the second exterior member may be coupled to the first exterior member.

Referring back to FIGS. 3 and 4, the uncoated region 11b of the positive electrode 11 includes inner and outer uncoated regions 111b and 112b in a terminal end portion that is disposed at an outermost side of the electrode assembly 110, and inner and outer uncoated regions 113b and 114b in a front end portion of the electrode assembly 110 that is disposed at a center of the electrode assembly 110.

The uncoated region 12b of the negative electrode 12 includes inner and outer uncoated regions 121b and 122b in a terminal end portion that is disposed at an outermost side of the electrode assembly 110, and inner and outer uncoated regions 123b and 124b in a front end portion of the electrode assembly 110 that is disposed at a center of the electrode assembly 110.

The electrode assembly 110 includes laminating tapes 51 and 52 that are attached to opposite surfaces of the front end portions of the positive and negative electrodes 11 and 12 disposed at its center, and opposite surfaces of the terminal end portions of the positive and negative electrodes 11 and 12 disposed at its outermost side.

The laminating tape 51 attached to the positive electrode 11 includes first front end tapes 511a and 511b that are attached to opposite ends of the inner and outer coated regions 111a and 112a of the positive electrode 11 in the front end portion of the electrode assembly 110, and first terminal end tapes 512a and 512b that are attached to opposite ends of the inner and outer coated regions 111a and 112a of the positive electrode 11 in the terminal end portion thereof.

The first front end tapes 511a and 511b are applied to the opposite ends of the inner and outer coated regions 111a and 112a of the positive electrode 11 in the front end portion such that they are attached to the inner and outer uncoated regions 113b and 114b, thereby preventing the active materials of the inner and outer coated regions 111a and 112a from being broken away in the end portion.

The first terminal end tapes 512a and 512b are applied to the opposite ends of the inner and outer coated regions 111a and 112a of the positive electrode 11 in the terminal end portion such that they are attached to the inner and outer uncoated regions 111b and 112b, thereby preventing the active materials of the inner and outer coated regions 111a and 112a from being broken away in the end portion.

The laminating tape 52 attached to the negative electrode 12 includes second front end tapes 521a and 521b that are attached to opposite ends of the inner and outer coated regions 121a and 122a of the negative electrode 12 in the front end portion of the electrode assembly 110, and second terminal end tapes 522a and 522b that are attached to opposite ends of the inner and outer coated regions 121a and 122a of the negative electrode 12 in the terminal end portion thereof.

The second front end tapes 521a and 521b are applied to the opposite ends of the inner and outer coated regions 121a and 122a of the negative electrode 12 in the front end portion such that they are attached to the inner and outer uncoated regions 123b and 124b, thereby preventing the active materials of the inner and outer coated regions 121a and 122a from being broken away in the end portion.

The second terminal end tapes 522a and 522b are applied to the opposite ends of the inner and outer coated regions 121a and 122a of the negative electrode 12 in the terminal end portion such that they are attached to the inner and outer uncoated region 121b and 122b, thereby preventing the active materials of the inner and outer coated regions 121a and 122a from being broken away in the end portion.

Meanwhile, the positive electrode tab 14 is coupled to the outer uncoated region 112b in the terminal end portion that is disposed at the outermost side of the electrode assembly 110.

While facing the inner uncoated region 111b of the positive electrode 11, the negative electrode tab 15 is coupled to the outer uncoated region 122b of the negative electrode 12 in the terminal end portion that is disposed at the outermost side of the electrode assembly 110.

In this case, the positive electrode tab 14 is coupled to the coated region 11a while being disposed closer thereto than the negative electrode tab 15 in the terminal end portion that is disposed at the outermost side of the electrode assembly 110.

That is, when being spirally wound, the positive electrode tab 14 is wound first and then the negative electrode tab 15 is wound.

Accordingly, the negative electrode tab 15 is directed toward the inner uncoated region 111b of the positive electrode 11 in the terminal end portion.

The inner and outer uncoated regions 111b and 112b of the positive electrode 11 and the inner and outer uncoated regions 121b and 122b of the negative electrode 12, which are disposed in the terminal end portion and face each other, cause a short-circuit at the outermost side of the electrode assembly 110 when being penetrated by a conductive member, thereby improving a penetration characteristic of the rechargeable battery.

The electrode assembly 110 further includes an insulating laminating tape 53 to prevent the negative electrode tab 15 from electrically contacting the inner uncoated region 111b of the positive electrode 11.

The insulating laminating tape 53 is disposed between the negative electrode tab 15 and the inner uncoated region 111b of the positive electrode 11 to electrically insulate them.

In the terminal end portion that is disposed at the outermost side of the electrode assembly 110, the insulating laminating tape 53 provides an insulating structure between the inner uncoated region 111b of the positive electrode 11 and the negative electrode tab 15, thereby improving safety of the rechargeable battery even if the inner uncoated region 111b of the positive electrode 11 and the outer uncoated region 122b of the negative electrode 12 face each other.

In addition, the insulating laminating tape 53 is expanded to further electrically insulate the outer uncoated region 122b of the negative electrode 12 from the inner uncoated region 111b of the positive electrode 11.

As an example, the insulating laminating tape 53 is formed of polyethylene terephthalate, and may be attached to the inner uncoated region 111b of the positive electrode 11 that faces the negative electrode tab 15.

A second exemplary embodiment of the present invention will now be described.

For convenience, the same constituent elements as in the first exemplary embodiment will be omitted and different constituent elements will be described.

Figure 5:
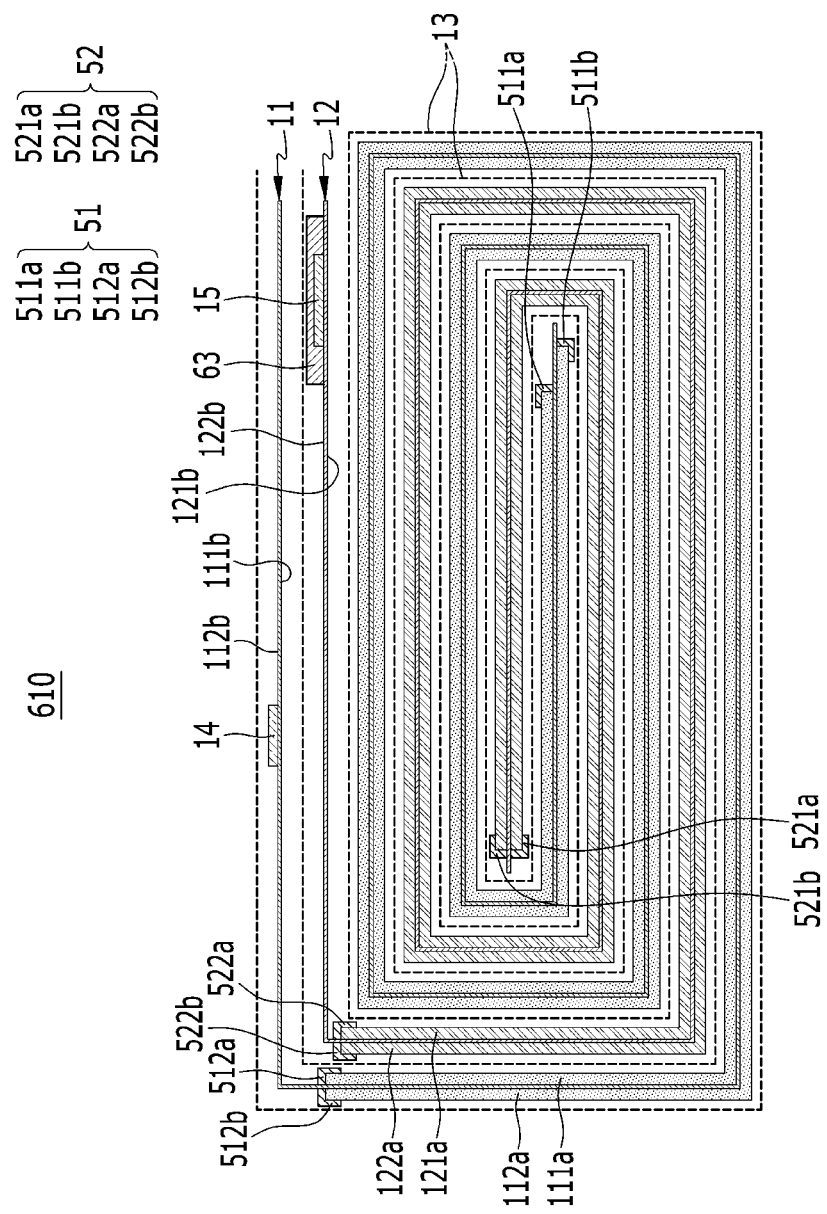
FIG. 5 is an enlarged cross-sectional view of an electrode assembly applicable to a rechargeable battery according to a second exemplary embodiment of the present invention.
Figure 6:
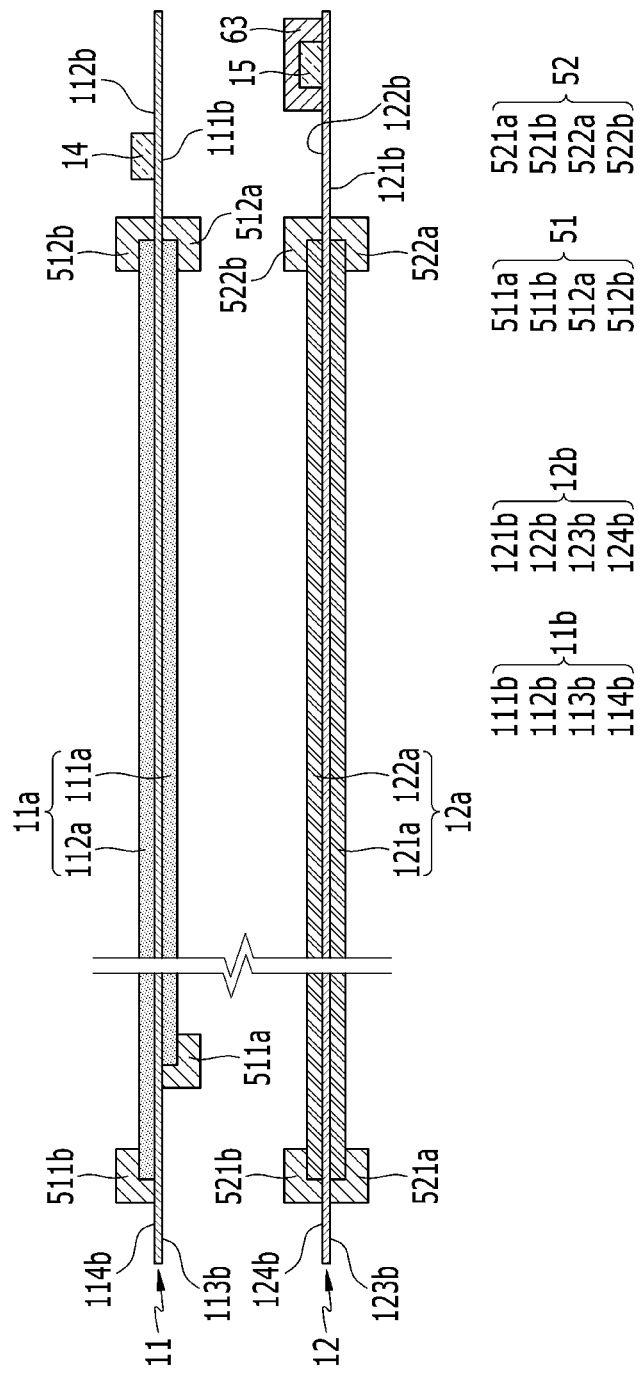
FIG. 6 is a cross-sectional view illustrating a state of a positive electrode and a negative electrode applicable to the electrode assembly of FIG. 4 being unfolded.

FIG. 5 is an enlarged cross-sectional view of an electrode assembly applicable to a rechargeable battery according to a second exemplary embodiment of the present invention, and FIG. 6 is a cross-sectional view illustrating a state of a positive electrode and a negative electrode applicable to the electrode assembly of FIG. 4 being unfolded.

Referring to FIGS. 5 and 6, in the electrode assembly 610, an insulating laminating tape 63 is attached to the negative electrode tab 15 that faces the inner uncoated region 111b of the positive electrode 11.

That is, the insulating laminating tape 63 is attached to the negative electrode tab 15 and the outer uncoated region 122b of the negative electrode 12 around the negative electrode tab 15.

Thus, the negative electrode tab 15 and the outer uncoated region 122b of the negative electrode 12 around the negative electrode tab 15 are electrically insulated from the inner uncoated region 111b of the positive electrode 12.

The insulating laminating tape 63 attached to the negative electrode tab 15 effectively insulates the negative electrode tab 15 from the inner uncoated region 111b of the positive electrode 12 even when an alignment error therebetween occurs due to the spiral winding.

In the exemplary embodiment of the present invention, a pouch type of rechargeable battery is illustrated, but it may also be applicable to prismatic and cylindrical rechargeable batteries.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly spirally wound by interposing a separator between a first electrode and a second electrode that include uncoated regions and coated regions;
   a case for accommodating the electrode assembly;
   a first electrode tab and a second electrode tab coupled to the first and second electrodes to be drawn out of the case;
   laminating tape attached to opposite surfaces of a front end portion at the first and second electrodes disposed at a center of the electrode assembly and attached to opposite surfaces of a terminal end portion disposed at an outermost side of the electrode assembly, wherein the second electrode tab is coupled to the uncoated region of the second electrode toward the uncoated region of the first electrode in the terminal end portion that is disposed at the outermost side of the electrode assembly, the first electrode tab is coupled to the uncoated region of the first electrode while being disposed closer to the coated region than the second electrode tab in the terminal end portion that is disposed at the outermost side of the electrode assembly; and
   an insulating laminating tape for inhibiting the second electrode tab and the uncoated region of the first electrode from electrically contacting each other.

2. The rechargeable battery of claim 1, wherein the coated regions are formed on opposite surfaces of the first electrode and on opposite surfaces of the second electrode, the laminating tape includes a first front end tape that is attached to opposite ends of the coated region of the first electrode in the front end portion, and a first terminal end tape is attached to opposite ends of the coated region of the first electrode in the terminal end portion.

3. The rechargeable battery of claim 2, wherein the laminating tape includes a second front end tape that is attached to opposite ends of the coated region of the second electrode in the front end portion, and a second terminal end tape that is attached to opposite ends of the coated region of the second electrode in the terminal end portion.

4. The rechargeable battery of claim 1, wherein the insulating laminating tape is attached to the uncoated region of the first electrode that faces the second electrode tab.

5. The rechargeable battery of claim 1, wherein the insulating laminating tape is attached to the second electrode tab that faces the uncoated region of the first electrode.

6. The rechargeable battery of claim 1, wherein the insulating laminating tape is formed of polyethylene terephthalate.

7. The rechargeable battery of claim 1, wherein the first electrode is a positive electrode, and the second electrode is a negative electrode.

8. A rechargeable battery comprising:
   an electrode assembly that is wound from a center portion to a terminal end portion with separator interposed between a first electrode and a second electrode that include uncoated regions and coated regions;
   a case for accommodating the electrode assembly;
   a first electrode tab and a second electrode tab coupled to the first and second electrodes to be drawn out of the case; and
   a first laminating tape attached to opposite surfaces of the center portion of the first and second electrode disposed at a center of the electrode assembly;
   a second laminating tape attached to opposite surfaces of a terminal end portion of the first and second electrode disposed at an outermost side of the electrode assembly, wherein the second electrode tab is coupled to the uncoated region of the second electrode toward the uncoated region of the first electrode in the terminal end portion that is disposed at the outermost side of the electrode assembly, the first electrode tab is coupled to the uncoated region of the first electrode while being disposed closer to the coated region than the second electrode tab in the terminal end portion that is disposed at the outermost side of the electrode assembly; and
   an insulating laminating tape interposed between the second electrode tab and the uncoated region of the first electrode.

9. The rechargeable battery of claim 8, wherein the coated regions are formed on opposite surfaces of the first electrode and on opposite surfaces of the second electrode, the laminating tape includes a first front end tape that is attached to opposite ends of the coated region of the first electrode in the front end portion, and a first terminal end tape is attached to opposite ends of the coated region of the first electrode in the terminal end portion.

10. The rechargeable battery of claim 9, wherein the laminating tape includes a second front end tape that is attached to opposite ends of the coated region of the second electrode in the front end portion, and a second terminal end tape that is attached to opposite ends of the coated region of the second electrode in the terminal end portion.

11. The rechargeable battery of claim 8, wherein the insulating laminating tape is attached to the uncoated region of the first electrode that faces the second electrode tab.

12. The rechargeable battery of claim 8, wherein the insulating laminating tape is attached to the second electrode tab that faces the uncoated region of the first electrode.

13. The rechargeable battery of claim 8, wherein the insulating laminating tape is formed of polyethylene terephthalate.

14. The rechargeable battery of claim 8, wherein the first electrode is a positive electrode, and the second electrode is a negative electrode.

* * * * *